(12) United States Patent
Yi et al.

(10) Patent No.: US 7,969,904 B2
(45) Date of Patent: *Jun. 28, 2011

(54) PACKET TRANSMISSION SCHEDULING TECHNIQUE

(75) Inventors: Seung June Yi, Seoul (KR); Woon Young Yeo, Gyeonggi-do (KR); So Young Lee, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 41 days.

This patent is subject to a terminal disclaimer.

(21) Appl. No.: 12/588,055

(22) Filed: Oct. 1, 2009

(65) Prior Publication Data

US 2010/0074213 A1 Mar. 25, 2010

Related U.S. Application Data

(63) Continuation of application No. 12/178,741, filed on Jul. 24, 2008, now Pat. No. 7,619,985, which is a continuation of application No. 10/301,625, filed on Nov. 22, 2002, now Pat. No. 7,515,616.

(30) Foreign Application Priority Data

Nov. 24, 2001 (KR) ................................. 2001-73641
Jan. 5, 2002 (KR) ................................. 2002-00631

(51) Int. Cl.
*H04J 1/16* (2006.01)
*H04L 12/56* (2006.01)

(52) U.S. Cl. ........ 370/252; 370/326; 370/412; 370/419; 370/519

(58) Field of Classification Search .................. 370/519, 370/252, 326, 412, 419
See application file for complete search history.

(56) References Cited

U.S. PATENT DOCUMENTS

| | | | |
|---|---|---|---|
| 5,784,597 A * | 7/1998 | Chiu et al. | 713/401 |
| 6,788,702 B1 | 9/2004 | Garcia-Luna-Aceves et al. | |
| 7,515,616 B2 | 4/2009 | Yi et al. | |
| 7,619,985 B2 | 11/2009 | Yi et al. | |
| 2003/0081692 A1* | 5/2003 | Kwan et al. | 375/295 |

* cited by examiner

*Primary Examiner* — John Pezzlo
(74) *Attorney, Agent, or Firm* — McKenna Long & Aldridge LLP

(57) ABSTRACT

A packet data transmission method of the HSDPA system includes collecting information on the quality of physical channels, a status of the MAC buffer, the priority level of data, the delay of data, and the like, determining the transmission order of data and the size of a data block to be transmitted based on the collected information, and transmitting the data block through the physical layer according to the order of transmissions. Since the HSDPA scheduler takes into account the delay of data, the quality of real-time services can be improved.

16 Claims, 7 Drawing Sheets

PACKET TRANSMISSION SCHEDULING TECHNIQUE

This application is a continuation of and claims benefit of U.S. patent application Ser. No. 12/178,741, filed Jul. 24, 2008 now U.S. Pat. No. 7,619,985, which is a continuation of U.S. patent application Ser. No. 10/301,625, filed Nov. 22, 2002 now U.S. Pat. No. 7,515 616, and claims priority to Korean Patent Application Serial No. KR 73641/2001, filed in the Republic of Korea on Nov. 24, 2001 and Korean Patent Application Serial No. KR 00631/2002, filed in the Republic of Korea on Jan. 5, 2002, the contents of each of the above-recited applications are incorporated by reference herein in their entireties.

BACKGROUND OF THE INVENTION

1. Field of the Invention

The present invention relates to a wireless communication system, and more particularly to packet transmission scheduling of the High Speed Downlink Packet Access (HSDPA) system operated in a UMTS terrestrial radio access network (UTRAN).

2. Background of the Related Art

The Universal Mobile Telecommunications System (UMTS) is a third generation mobile communication system, which evolved from a Global System for Mobile Communications (GSM) and a European style mobile communication standard. It is intended to provide improved mobile communication services based on a GSM core network (CN) and Wideband Code Division Multiple Access (WCDMA) access technology.

For the purpose of making a standard for third generation mobile communication systems (IMT-2000 systems) based on GSM core network and WCDMA radio access technology, a group of standard developing organizations, including ETSI of Europe, ARIB/TTC of Japan, T1 of U.S., and TTA of Korea, established the Third Generation Partnership Project (3GPP).

For the purpose of efficient management and technological development, five Technical Specification Groups (TSGs) were organized under the 3GPP in consideration of network construction factors and their operations.

Each TSG is responsible for approving, developing, and managing specifications related to a pertinent area. Among them, the Radio Access Network (RAN) group has developed functions, requirements, and interface specifications related to UE and UMTS terrestrial radio access network (UTRAN) in order to establish a new radio access network specification to the third generation mobile communication system.

The TSG-RAN group consists of one plenary group and four working groups. Working Group 1 (WG1) has been developing specifications for a physical layer (Layer 1) and WG2 has been specifying functions of a data link layer (Layer 2) between UE and UTRAN. In addition, WG3 has been developing specifications for interfaces among Node Bs (the Node B is a kind of base station in the wireless communications), Radio Network Controllers (RNCs), and the core network. Lastly, WG4 has been discussing requirements for radio link performance and radio resource management.

FIG. 1 illustrates a structure of the UTRAN defined in 3GPP. As shown in FIG. 1, the UTRAN 110 includes at least one radio network sub-systems (RNSs) 120 and 130. Each RNS 120, 130 includes an RNC 121, 131 and at least one or more Node Bs 122, 123, 132, 133. For example, Node B 122 is managed by RNC 121, and receives information transmitted from the physical layer of the UE 150 through an uplink channel and transmits a data to the UE 150 through a downlink channel.

Accordingly, the Node B acts as an access point of the UTRAN from the UE point of view.

The RNCs 121 and 131 allocate and manage radio resources of the UMTS and are connected to a suitable element of the core network 140 depending on types of services provided to users.

For example, the RNCs 121 and 131 are connected to a mobile switching center (MSC) 141 for a circuit-switched communication such as a voice call service, and are connected to a Serving GPRS Support Node (SGSN) 142 for packet switched communication such as a wireless Internet service.

The RNC in charge of a direct management of the Node B is called a Control RNC (CRNC). The CRNC manages common radio resources.

On the other hand, the RNC that manages dedicated radio resources for a specific UE is called a Serving RNC (SRNC). The CRNC and the SRNC can be co-located in the same physical node. However, if the UE has been moved to an area of a new RNC that is different from SRNC, the CRNC and the SRNC may be located at physically different places.

There is an interface that can operate as a communication path between various network elements. The interface between a Node B and a RNC is called a Iub interface, and an interface between RNCs is called a Iur interface. And an interface between the RNC and the core network is called a Iu interface.

FIG. 2 illustrates a protocol structure of a radio interface protocol defined in the 3GPP. As shown in FIG. 2, the radio interface protocol horizontally includes a physical layer, a data link layer, and a network layer, and is vertically divided into a control plane for transmission of control information (signaling) and a user plane for transmission of data information.

The user plane is a region through which user traffic such as voice information or IP (Internet Protocol) packets is transmitted, and the control plane is a region through which control information required for network maintenance and management is transmitted.

Of the layers, the physical layer (PHY) handles transmission of data using a wireless physical channel between the UE and the UTRAN. The typical functions of the physical layer include data multiplexing, channel coding, spreading, and modulation.

The physical layer exchanges information with a Medium Access Control (MAC) layer through a transport channel. The transport channel is classified into a dedicated transport channel and a common transport channel depending on whether its use is dedicated to one UE or whether it is shared among several UEs.

The MAC layer transmits data by using a suitable mapping between logical channels and transport channels. The MAC layer is internally divided into two sub-layers, to with a MAC-d sub-layer which manages the dedicated transport channel, and a MAC-c/sh sub-layer which manages the common transport channel. The MAC-d sub-layer is located in the SRNC and the MAC-c/sh sub-layer is located in the CRNC.

There are various kinds of logical channels according to what kind of information the channel carries. The logical channel can be divided into two channels. One logical channel is a control channel for transmission of the control plane information and the other is a traffic channel for transmission of the user plane information.

The radio link control (RLC) layer is responsible for reliable transmission of RLC protocol data units (PDUs). The RLC may segment or concatenate RLC service data units (SDUs) delivered from the higher layer. If the RLC PDUs are ready, they are delivered to the MAC layer and transmitted sequentially to the other node (UE or UTRAN). Sometimes, the RLC PDU can be lost during the transmission. In this case, the lost PDU can be retransmitted. The retransmission function of the RLC layer is called an Automatic Repeat reQuest (ARQ).

The RLC layer may include several RLC entities. Each of them performs an independent radio link control function. The operation mode of each RLC entity is one of transparent mode (TM), an unacknowledged mode (UM), and an acknowledged mode (AM) depending on the adopted functions.

The Packet Data Convergence Protocol (PDCP) layer is positioned over the RLC layer and efficiently transmits data of network protocols such as IPv4 or IPv6. For example, a header compression method in which header information of a packet is reduced can be used. The PDCP layer may include several independent PDCP entities like the RLC layer. The Broadcast/Multicast Control (BMC) layer is responsible for transmitting broadcast messages from a Cell Broadcast Center (CBS) positioned at a core network. The primary function of BMC is to schedule and transmit cell broadcast messages destined for a UE. The BMC layer, in general, uses an RLC entity operated in the unacknowledged mode in order to transmit broadcast messages.

Finally, the Radio Resource Control (RRC) layer is a layer defined in the control plane. The RRC performs functions of establishment, reestablishment, and release of radio resources. In addition, the RRC layer can exchange control information between UE and UTRAN using RRC messages.

The maximum transmission rate of UMTS is 2 Mbps in the indoor and pico-cell environment, and 384 Kbps in the outdoor environment. However, as wireless Internet services have become popular, various services require higher data rates and higher capacity. Although UMTS has been designed to support multimedia wireless services, the maximum data rate of 2 Mbps is not enough to satisfy the required quality of services. Therefore, the 3GPP is conducting research directed to providing an enhanced data rate and radio capacity. One result of the research is the High Speed Downlink Packet Access (HSDPA). The purpose of the HSDPA system is to provide a maximum data rate of 10 Mbps and to improve the radio capacity in the downlink.

Various techniques in the HSDPA system include Link Adaptation (LA) and Hybrid Automatic Repeat reQuest (HARQ).

In the LA method, the UTRAN can choose the appropriate modulation and coding scheme (MCS) according to the channel condition. For example, if the channel condition is good, LA uses 16 Quadrature Amplitude Modulation (QAM) to increase the throughput. If a channel condition is not as good, however, LA uses Quadrature Phase Shift Keying (QPSK) to increase the probability of success.

The HARQ method retransmits lost packets, but the exact operation is different than the retransmission method in the RLC layer. If one packet is corrupted during transmission, HARQ transmits another packet that contains the additional information for recovery. The retransmitted packet and the original packet are combined in the receiver. The retransmitted packet may contain the same information as that of the previously transmitted data, or may contain any additional supplementary information for data recovery.

Since the HSDPA system is an evolutional form of the UMTS system, the conventional UMTS network needs to be maintained as much as possible to support backward compatibility and to reduce the cost of network deployment. However, some minor changes are inevitable.

To reduce the impact of the changes, most of the features are supported in Node B. This means that other parts of the UMTS network will not be affected. Accordingly, some functions in Node B need to be changed and some MAC functions are transferred from RNC. The MAC functionalities constitute a new MAC sublayer in Node B and it is called "MAC-hs" sublayer.

The MAC-hs sublayer is placed above the physical layer, and performs packet scheduling and various other functions (including HARQ and LA). In addition, the MAC-hs sublayer manages a transport channel called an HSDPA—Downlink Shared Channel (HS-DSCH), which is used to deliver data from the MAC-hs sublayer to the physical layer.

FIG. 3 shows a structure of a radio interface protocol for the HSDPA system. As shown in FIG. 3, the MAC-hs sublayer is placed over the physical layer (PHY) in the Node B. In both the UE and UTRAN, the MAC-hs sublayer transfers data to the upper layer through MAC-c/sh and MAC-d sublayers. The MAC-c/sh and the MAC-d sublayers are located in the CRNC and the SRNC, respectively, as in the related art system. In FIG. 3, an HS-DSCH Frame Protocol (FP) delivers the HSDPA data on the Iub or the Iur interface.

FIG. 4 illustrates the structure of the MAC layer in the HSDPA system. As shown in FIG. 4, the MAC layer is divided into a MAC-d sublayer 161, a MAC-c/sh sublayer 162, and a MAC-hs sublayer 163. The MAC-d sublayer 161 is in the SRNC and manages dedicated logical channels. The MAC-c/sh sublayer 162 is located in the CRNC and manages a common transport channel. The MAC-hs sublayer 163 is located in the Node B and manages the HS-DSCH.

In the HSDPA system, the MAC-c/sh sublayer 162 controls the data flow between the MAC-d sublayer 161 and the MAC-hs sublayer 163. The flow control function is used to prevent data from being discarded during network congestion, and to reduce the time delay of signaling signals. The flow control can be performed independently according to a priority of data transmitted through each HS-DSCH.

The HARQ function, as stated previously, improves the efficiency of data transmission. In the Node B, the MAC-hs sublayer 163 contains one HARQ block that supports the HARQ function. The HARQ block includes several HARQ entities for controlling a HARQ operation of each UE. There is one HARQ entity for each UE in the HARQ block.

Moreover, there are several HARQ processes inside each HARQ entity. Each HARQ process is used for transmission of the "data block," which is composed of one or more MAC MAC-hs SDUs. The data block is processed one by one in the HARQ process.

If the specific data block is successfully transmitted, the HARQ process can treat another data block. If the transmission fails, the HARQ process retransmits the data block until the data block is either successfully transmitted or discarded. The number of MAC-hs SDUs constituting the data block differs depending on the status of the radio channel. If the channel is in a good condition, it can transmit more MAC-hs SDUs. Conversely, if the channel is in a bad condition, it can transmit fewer MAC-hs SDUs, and therefore a relatively small number of MAC-hs SDUs comprises a data block.

The scheduling block determines the size of the data block based on the information (channel condition) from the physical layer. Each data block can be transmitted in the unit of Transmission Time Interval (TTI) which is 2 ms in the HSDPA system. In addition, the scheduling function of the Node B determines the order of the data transmission according to the priorities of data. The scheduling block adds a priority class identifier (PCI) and a transmission sequence number (TSN) to the data block and delivers it to a suitable HARQ process. If the transmission of the data block is not successful, the identical data block is retransmitted.

The TFC selection function selects the appropriate transport format of each HS-DSCH when several HS-DSCHs are used for the data transmission. The transmission procedure is described with reference to FIG. 4.

The channel switching block in the MAC-d layer determines the transmission path of the PLC PDU, which is transferred through a Dedicated Traffic Channel (DTCH) or a Dedicated Control Channel (DCCH) from the RLC layer. If the RLC PDU is going to be transmitted to the Dedicated channel (DCH), a header field is added into the PDU and it is transmitted to the physical layer through the DCH. If the HS-DSCH channel is used, the RLC PDU is transmitted to the MAC-c/sh sublayer 162 through a transmission channel multiplexer (T/C MUX). The T/C MUX adds identification information into the header of the PDU in order to identify the logical channel to which each data belongs.

Upon receiving the RLC PDU, the MAC-c/sh sublayer 162 transfers the packet to the MAC-hs sublayer 163. Subsequently, the data transmitted to the MAC-hs sublayer is stored in a buffer of the MAC-hs sublayer 163 and constructed as a data block with a suitable size. The scheduling function determines the size of the data block based on the channel condition. Next, the PCI and TSN are added to the data block, and it is delivered to the HARQ process by the scheduling function.

FIG. 5 illustrates an operation of the scheduling block of the MAC-hs sublayer in Node B. As shown in FIG. 5, the HSDPA scheduler 174 receives information regarding a data priority and an amount of stored data from a storage unit 171, and receives channel status information from the physical layer 173 (S101, S102).

The storage unit 171 is preferably a soft memory in which data can be easily erased and written, and stores the MAC-hs SDUs delivered from an upper layer.

The scheduler 174 controls the operations of the storage unit 171 and the HARQ entity 172 based on the information (steps S103, S104). The scheduler 174 determines the size of the data block, and constitutes the data block, and adds PCI and TSN fields in the data block. Next, the scheduler 174 transmits the corresponding data block to a suitable HARQ process in the HARQ entity, where the data block will be transmitted through the physical layer.

If the data block is successfully transmitted, the corresponding data in the storage unit 171 is deleted based on the feedback information (step S105). At the same time, the HARQ block reports to the scheduler 174 whether or not the data block has been successfully transmitted. Using the transmission result, the scheduler 174 can adjust the transmission of data blocks (step S106).

In general, overall system efficiency and capacity can be determined by an adopted scheduling algorithm. Therefore, the scheduling algorithm should be suitable for characteristics of the provided service.

A scheduling algorithm used in the HSDPA system is currently based on the priority information of each data. The scheduler monitors data in the storage unit of the MAC-hs sublayer, and transmits the data block having the higher priority.

The priority information of each data (MAC-hs SDU) is transferred through a HS-DSCH FP (Frame Protocol) between the Node B and the RNC.

FIG. 6 illustrates a structure of the frame structure of the HS-DSCH FP in the HSDPA system. Referring to FIG. 6, CmCH-PI (Common Channel Priority Indicator) field indicates a priority of the MAC-hs SDUs included in the corresponding data frame, and has values of 0-15. '0' signifies the lowest priority, while "15" signifies the highest priority.

Even though the data priority is the main factor in the HSDPA scheduler, the information is only defined in the specific services. Services supported by the HSDPA include streaming services such as video on demand (VOD) and Audio on demand (AOD), interactive services such as Web browsing and file downloading, and background services such as e-mail and background data downloading. Among these services, the data priority is defined only for interactive services and background services. This has been true so far because the related art streaming services are provided by dedicated resources rather than common resources. However, the HSDPA system provides various services with the common resources.

Additionally, unlike other types of services, the service quality of streaming services is not guaranteed simply by the priority information because data of streaming services are real-time and delay-sensitive. That means there is no need to use the priority information of the data of streaming services.

Typically, real-time data will be lost if the delay of the data exceeds a certain delay limit. In order to reduce the loss of real-time data, the scheduler should take traffic characteristics of streaming services into consideration.

Because the current HSDPA scheduler operates based on the priorities of packets, the HSDPA scheduler may be suitable for non-real-time services (i.e. interactive services and background services). For teal-time services, however, the delay is the most important factor in scheduling. Consequently, there is a problem with the related art scheduler of HSDPA in that is does not take the delay component into account when the supporting services include streaming services.

The above references are incorporated by reference herein where appropriate for appropriate teachings of additional or alternative details, features and/or technical background.

SUMMARY OF THE INVENTION

An object of the invention is to solve at least the above problems and/or disadvantages and to provide at least the advantages described hereinafter.

It is another object of the present invention is to provide a packet transmission scheduling method of the HSDPA system suitable for traffic characteristics of each service in a multimedia environment where real-time and non-real-time data coexist, thereby enhancing a service quality.

It is another object of the present invention to provide a packet transmission scheduling method of the HSDPA system based on both delay information as well as data priorities in the Node B where real-time and non-real-time data coexist.

It is another object of the present invention to provide a packet transmission scheduling method of the HSDPA system that considers the delay information in the RLC layer and the delay in the MAC layer for real-time services.

It is another object of the present invention to deliver delay information or priority information of data in the RLC layer to the HSDPA scheduler by using the frame format of the frame protocol, which can contain the related control information.

To achieve at least the above objects in whole or in parts, there is provided a packet data transmission method of the HSDPA system, including the steps of: collecting information on the quality of physical channels, the status of the MAC buffer, the priority level of data, the delay of data, and the like; determining the transmission order of data and the size of a data block to be transmitted based on the collected information; and transmitting the data block through the physical layer according to the order of transmissions.

In the data transmission method of the HSDPA system of the preferred embodiment, the delay information of data means the delayed period during which the data remains in the MAC layer, or the total delayed period during which the data remains in the MAC layer and the upper layer. Also the delay information in the MAC layer is preferably measured by a timer provided in the MAC layer, and the delay information in the upper layer can be measured by an additional timer or by a timer designed for the specific use in the upper layer. Moreover, the delay information in the upper layer is preferably transferred together with data themselves by using a frame protocol on the Iub or Iur interface.

In a first embodiment of the present invention, the frame protocol uses two frame formats. The frame protocol preferably selects one of the two frame formats depending on the type of data to be transmitted. Both headers of the two formats include the data type field to identify the type of data. The first frame format of the frame protocol preferably includes the data priority field, and the second frame format preferably includes the delay field. If the data to be transmitted is non-real-time, the frame protocol transmits the data together with priority information by using the first format. If the data is real-time, the frame protocol transmits the data together with the delay information in the upper layer by using the second format.

In a second embodiment of the present invention, the frame format of the frame protocol preferably includes all of the priority field and the delay field. Thus, if the data to be transmitted is non-real-time, the priority field is set, while if the data to be transmitted is real-time, the delay field is set.

In a third embodiment of the present invention, the frame format of the frame protocol preferably includes the priority field, and if the data to be transmitted is real-time, the delay information is converted into the priority information. The closer the data comes to the maximum delay or the more the delay is increased, the higher the priority is set.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein.

DETAILED DESCRIPTION OF PREFERRED EMBODIMENTS

Figure 1:
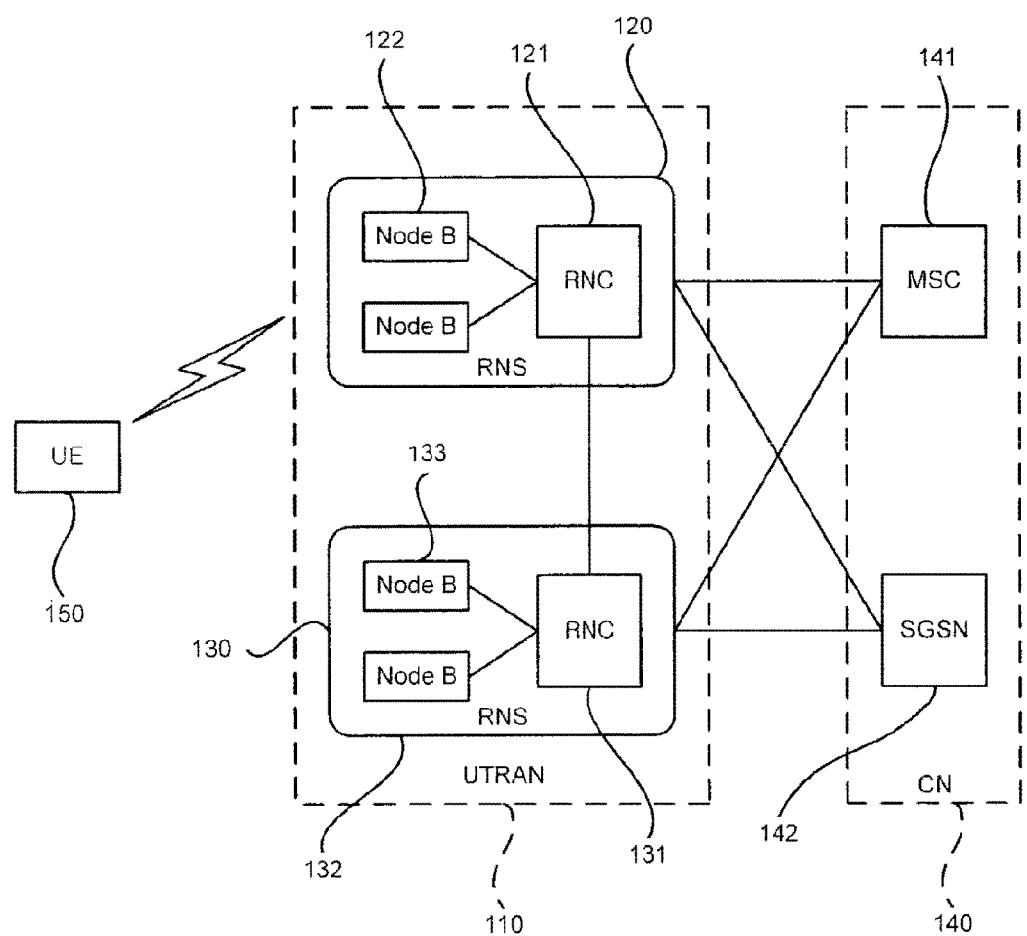
FIG. 1 is a drawing showing a structure of the UMTS radio access network (UTRAN)
Figure 2:
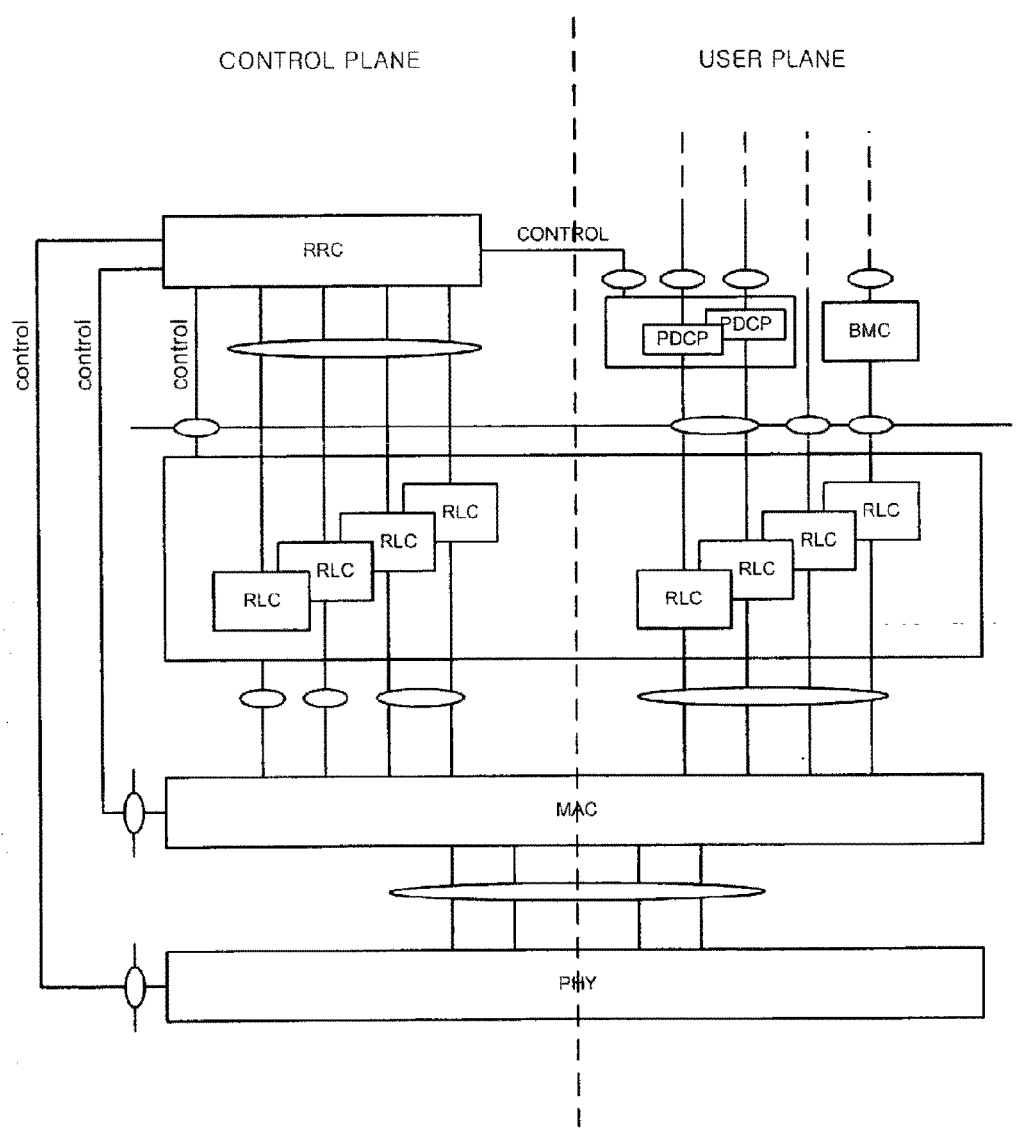
FIG. 2 is a drawing showing a protocol structure of the UMTS radio interface.
Figure 3:
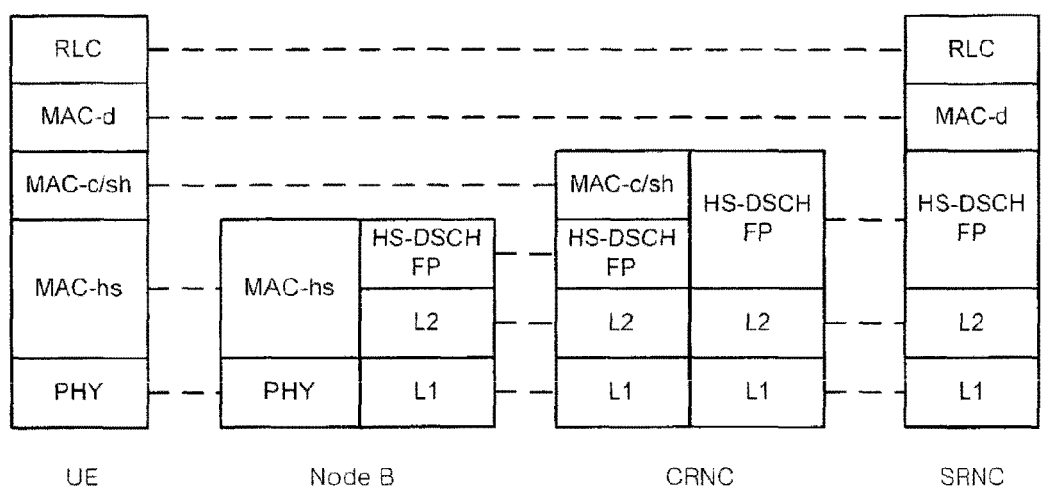
FIG. 3 is a drawing showing a structure of radio access protocols for the High Speed Downlink Packet Access (HSDPA) system.
Figure 4:
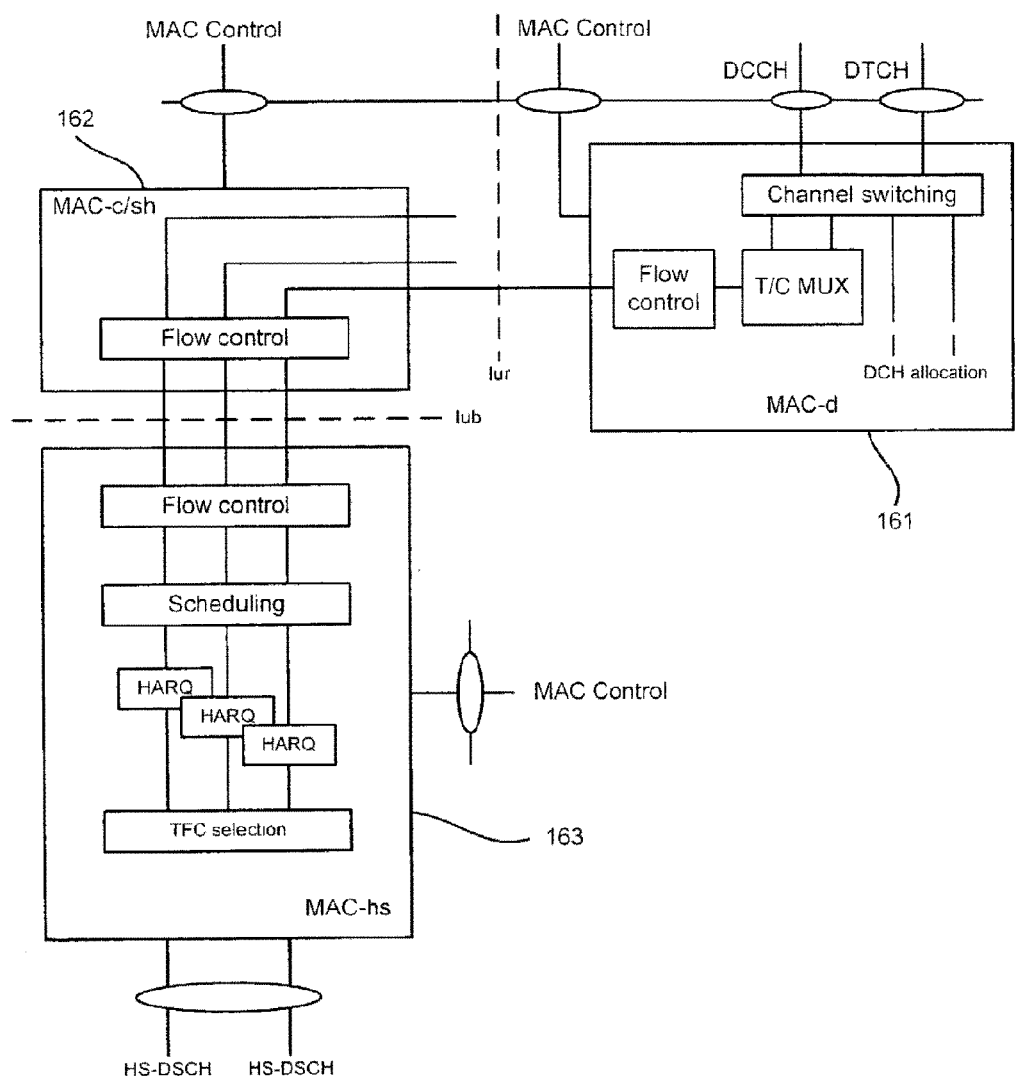
FIG. 4 is a drawing showing a structure of the MAC layer supporting the HSDPA system.
Figure 5:
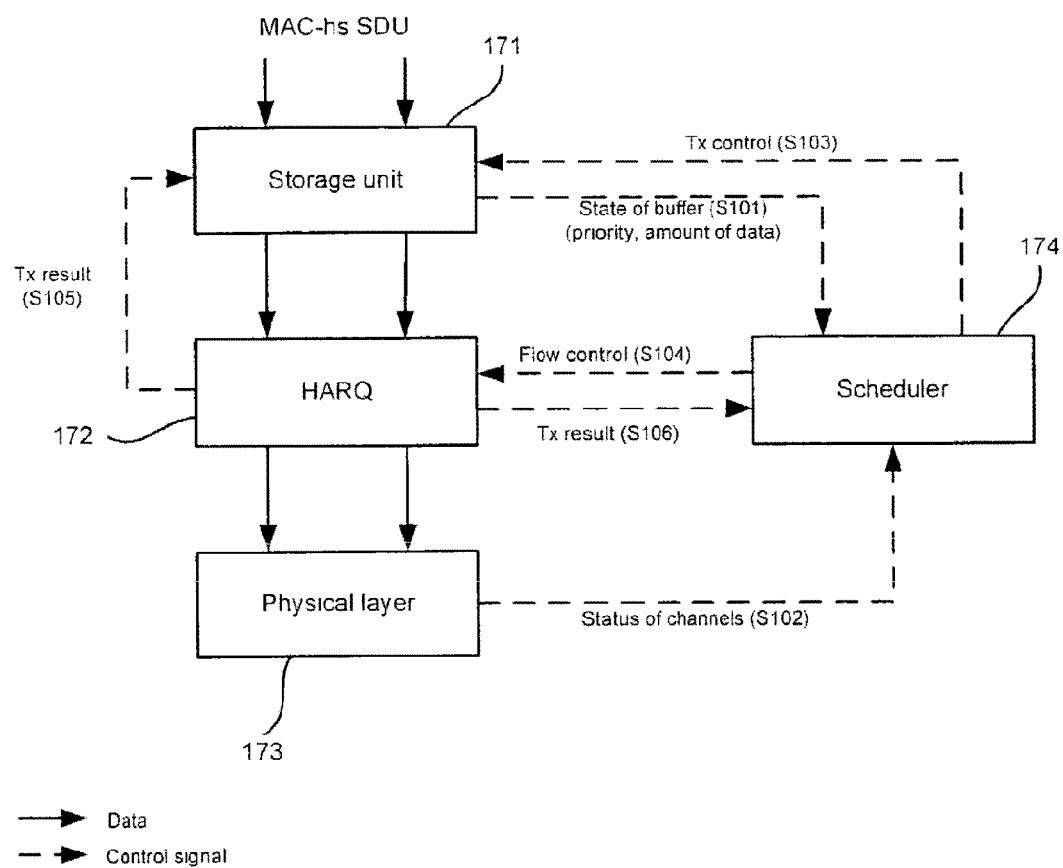
FIG. 5 is a block diagram of the related art HSDPA scheduler in the MAC-hs sublayer.

The HSDPA system should support both the real-time service and non-real-time service. For non-real-time service, the scheduling method can be based on the related art service that is based on the relative priority of data. However, for real-time service, the delay information of data is preferably taken account in determining the transmission priority.

A packet transmission scheduling method in the HSDPA system of the preferred embodiment provides a method for increasing the quality of real-time services.

In general, the data delay of the real-time service signifies the transmission delay of the data between end users or between an end user and a server. The delay can occur at diverse parts of transmission paths, such as in the radio interface, UTRAN, core network, or the like.

Every delay that occurs in the various parts should be taken into account, but it is not easy to consider the diversity of the delay in all of the regions in the network. Thus, the UMTS separates the delay in UTRAN from the delay in the other network elements. For example, the transmission delay of real-time data should not exceed a maximum 250 ms between the UE and the SGSN (or MSC).

As for the transmission path in the HSDPA system, the data coming into the core network from an outside network is delivered to the RNC of the UTRAN through the SGSN or the MSC, and finally transferred to the Node B. In the UTRAN, a transmission buffer is located at the RNC (RLC layer) and the Node B (MAC layer). In order to consider the delay of the real-time data, the delay information at the RLC layer or the MAC layer needs to be considered.

In particular, since the HSDPA scheduler in the Node B substantially handles the data transmission, the scheduler needs to use the delay information for transmission. The delay information of the HSDPA scheduler can be divided into two types. One is the delay generated at the RNC, and the other is the delay at the Node B.

First, let us consider the delay in the RLC layer. In order for the delay information at the RNC to be used in the HSDPA scheduler, the corresponding data and its related delay information need to be transmitted together to the Node B. That means the delay information is transmitted to the Node B through the Iur interface or the Iub interface.

If the HSDPA system supports real-time services, the conventional HS-DSCH FP can be adopted to transmit the data delay information. However, since there is no space for delay information in the frame format of the frame protocol, some corrections should be made therefore. An example of the format will be described later.

On the other hand, a timer is required to measure the delay of data at the RLC layer. However, a new timer is not necessary; rather, the timer used in the related art UMTS can be used. For example, the discard timer called Timer_Discard is ready at the RLC layer to measure the lapse of time until each RLC SDU is successfully transmitted after arriving at the RLC layer. The value of the discard timer can be used as the delay information at the RLC layer.

Next, another delay information that the HSDPA scheduler can use is generated by the Node B itself. The delay can be measured by a timer after the data is transmitted to the MAC layer in the Node B.

Figure 7:
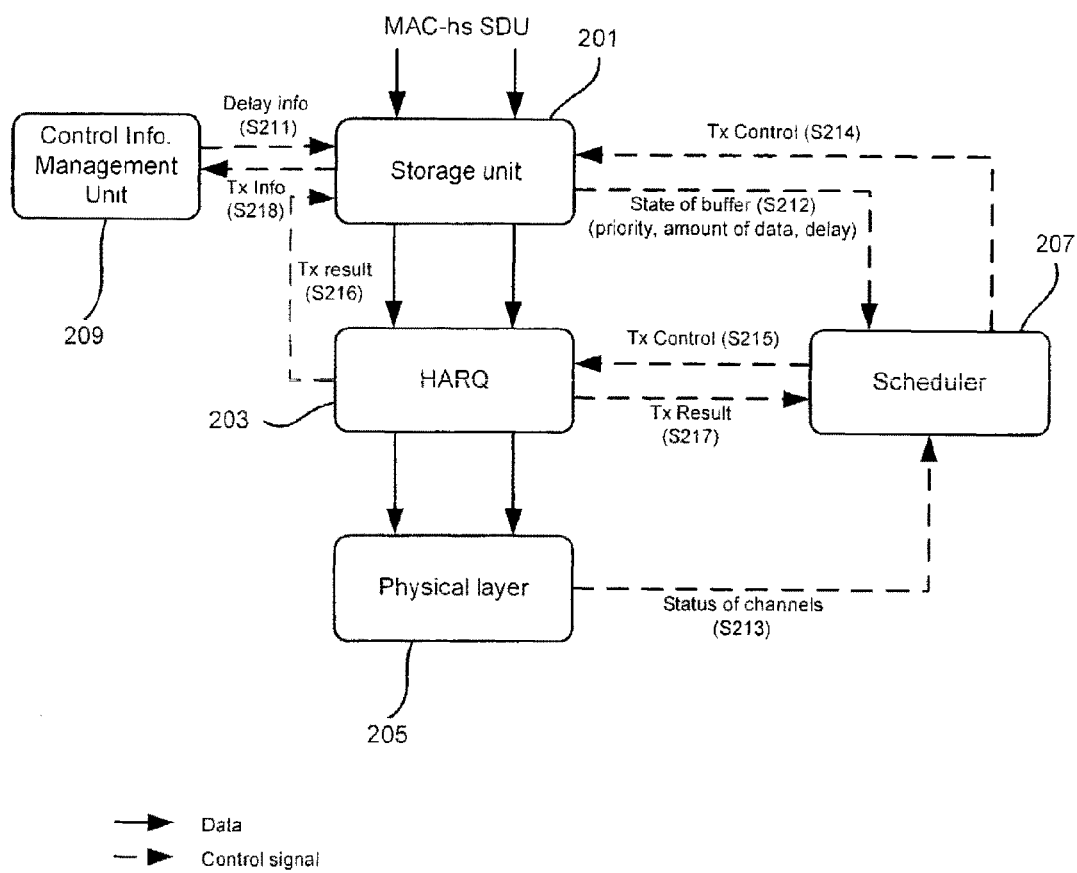
FIG. 7 is a block diagram showing a packet scheduler of the HSDPA system in accordance with the preferred embodiment of the present invention.

FIG. 7 is a block diagram showing an operation of the scheduler positioned at the MAC-hs sublayer in accordance with the preferred embodiment of the present invention. Referring to FIG. 7, the MAC-hs sublayer positioned at the Node B receives real-time data from the upper layer and also receives scheduling control information related to the data. The scheduling control information can include relative priority information of the data, delay information of the data, the amount of stored data in the upper layer, or the like.

A control information management unit 209 maintains the scheduling control information received from the upper layer, and determines whether the data has been transmitted based on the transmission information coming from the storage unit (step S210). The control information is shared by the scheduler and used as basic scheduling information.

The data in the MAC-hs sublayer is stored in the storage unit 201, and transmitted according to the decision of the scheduler 207. The storage unit 201 transmits information regarding the buffer status to the scheduler 207 (step S212). The status information can include the data priority, the amount of upper layer data, the amount of data in the storage unit, and the delay information of data.

The timer that measures the elapsed time of data can be located at the storage unit or at the control information management unit 209. In FIG. 7, it is assumed that the timer is located at the storage unit 201. The initial value of the timer can be set to the elapsed time of the data in the upper layer. Since the elapsed time in the upper layer can be stored in the control information management unit 209, it can be transferred using the delay information (step S211). If necessary, the initial value of the timer can be set to 0, which means that only the delay in the storage unit 201 is used for the delay information of data.

Next, the scheduler 207 receives buffer status information from the storage unit 201 (step S212) and receives channel status information from the physical layer 205 (step S212). Based on the buffer status information from the storage unit 201 and the channel status information from the physical layer 205, the scheduler 207 performs the transmission scheduling of data. The scheduler 207 determines the size of the data block to be transmitted, and selects the MAC-hs SDUs to be contained in the data block. PCI and TSN are also added to the organized data block. Transmission control information is then provided to the storage unit 201 and the HARQ 203, and the data block is then transmitted to the HARQ block 203 and transmitted through the physical layer 205 (steps S214 and S215).

After transmission of the data block, the HARQ 203 provides a transmission result to the storage unit 201 (step S216). If the data block has been successfully transmitted, the storage unit 201 discards the corresponding data (MAC-hs SDUs) from the unit, and also deletes the scheduling control information related to the data from the control information management unit 209. The storage unit 201 then informs the scheduler 207 of the transmission result (step S217). If the data block fails to be transmitted, the HARQ block 203 informs the scheduler 207 of the failure, so that the scheduler 207 can retransmit the data block (S217).

There are two methods for managing the delay information of data.

The first method is to use the total delay of data. In this method, the delay of data comes from diverse parts of the network. That is, in order to take into account the delay in the MAC-hs sublayer and the delay in the upper layer (e.g. RLC layer), the delay at the MAC-hs sublayer and the delay in the upper layer are summed. The summed delay of data can be thought of as the accurate delay, because all aspects of delay are considered.

The second method is adopted when the delay of data in the upper layer can be ignored, or when the delay of data at the MAC-hs sublayer is the major portion of the delay. In such a case, because the delay information at the upper layer is not necessary, only the delay in the MAC-hs sublayer is considered.

In both the methods, when the MAC-hs SDU is received from the upper layer, the storage unit of the MAC-hs sublayer starts to measure the delay of the corresponding data. In the first method, the delay in the upper layer is delivered together with the related data, and added to the delay in the MAC-hs sublayer. The total delay of the data is reported to the scheduler. In the second method, conversely, only the delay in the MAC-hs sublayer itself is reported to the scheduler.

Referring to the first method, since the delay information in the upper layer is transmitted through the Iur or the Iub interface, a new system standard is required between heterogeneous systems. Solutions for this will now be described.

Figure 6:
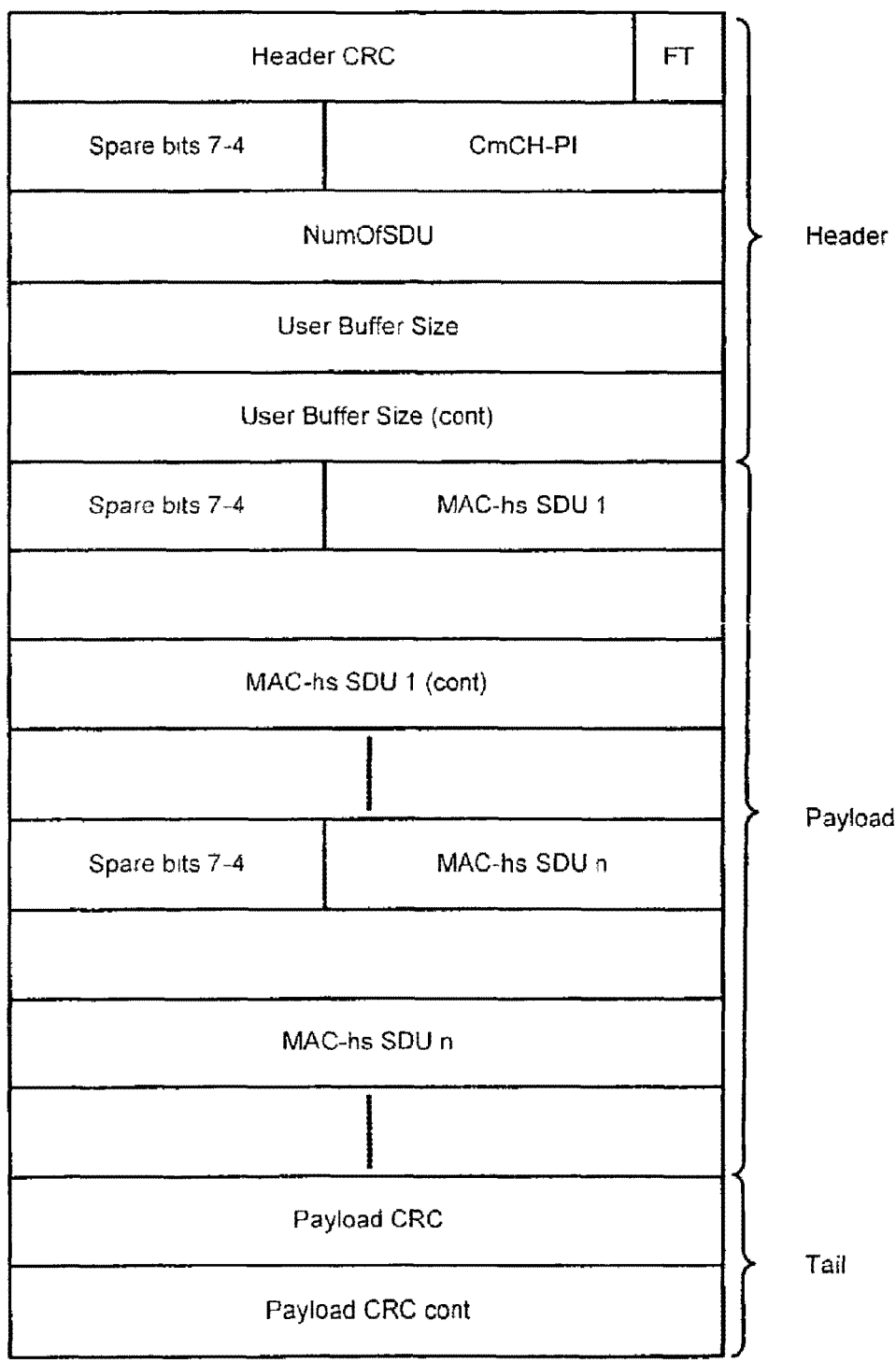
FIG. 6 is a drawing showing a structure of a frame used in the HS-DSCH Frame Protocol.

The delay information in the upper layer is transmitted to the MAC-hs sublayer by the HS-DSCH FP as shown in FIG. 6. However, since there is no field for transmitting the delay information using the HS-DSCH FP, an additional field is required.

The value of the delay field can include the actual delay information. However, since the value of the field is to be expressed as a digital value, it is necessary to express the field value in a suitable form. For example, if a delay time is 95.32 ms, the whole and accurate value may not be transmitted. In the field of the HS-DSCH FP, the delay of 95.32 ms is converted to a suitable digital value based on the time unit such as 1 ms unit or 2 ms. For example, if the reference unit is 1 ms, a value of 95 is set.

In the preferred embodiment, the delay is expressed with the unit of TTI, a basic transmission time unit used in the HSDPA. The reason is because the scheduler transmits the data in the TTI unit.

In general, the maximum delay allowed by UMTS is about 250 ms. The elapsed time in the upper layer should not exceed this value. Accordingly, if the TTI is 2 ms, the maximum value of the field is 125. Thus, with 7 bits, it would be sufficient to provide the delay information.

Consequently, because the new field of the frame format is required to express the delay of data, a new and different frame format structure needs to be used. Two solutions are proposed hereinbelow.

The first method uses two independent frame formats for real-time and non-real-time data, respectively. In general, delay information is not required for the non-real-time data, while priority information is not needed for the real-time data. Thus, for non-real-time data, the same frame format as the related art frame format can be used as it is. However, for real-time data, a field containing the delay information is necessary and the priority information (CmCH-PI) field can be removed. In addition, in order to differentiate the two frame formats, an additional indication field is required in the header of the frame format. For example, using a '1' can indicate the format for non-real-time data, while a '0' can indicate the format for real-time data.

The second method uses one frame format for both real-time and non-real-time data. For this purpose, the frame format of the current HS-DSCH FP needs to be extended. The extended frame format preferably includes a field for delay information. In this method, some fields in the frame format can be disabled depending on types of data. For example, for the non-real-time data, the delay field is not used, while for the real-time data, the priority field is not used. In order to recognize the field being used, a field indicating the type of data should be additionally included in the header of the frame format.

In the above description, diverse methods for transmitting the delay information via the network interface have been discussed. However, some service providers are not willing to change the current system. Consequently, the current frame format should support the real-time and non-real time data. But, as described before, there is currently no field for delay information.

One way to overcome this problem is to convert the delay information into the priority information. The priority means the urgency level of data. Thus, the higher the priority, the faster the data will be transmitted. This means that the scheduler can adjust the transmission delay with the priority. If the delay is properly converted to the priority value, then the real-time service can be supported.

Thus, the upper layer monitors the delay of data to determine the transmission urgency level. When the upper layer includes the data in the frame format of HS-DSCH FP, it converts the delay into the appropriate priority value and includes it in the priority field of the frame format. For example, if the delay of the data reaches the maximum delay limit, the corresponding data is given a high priority. Generally speaking, the real-time data would have a relatively high priority because the non-real-time traffic is not time-sensitive.

Finally, the scheduler in the MAC-hs sublayer should be aware of the maximum transmission delay (T_MAX) for each real-time service. Assume that the delay of the MAC-hs SDU (T_Total) means the total delay of the data in the UTRAN. If the delay in the upper layer is considered T_Total corresponds to the sum of the delay in the upper layer T_RLC and the delay in the MAC layer T_MAC (T_Total=T_RLC+T_MAC). If the delay is only in the MAC-hs sublayer, T_Total=T_MAC.

Accordingly, the scheduler transmits the emergent data first. That means, the smaller the difference between T_MAX and T_Total (T_MAX−T_Total) is, the faster the data is transmitted. If T_MAX−T_Total is smaller than '0', the corresponding MAC-hs SDUs are discarded because they have no meaning in the real-time service.

If the delay of the data in the upper layer is converted into the priority, the scheduler transmits the data with the highest priority first. If the value of T_MAX−T_Total becomes smaller than '0', the corresponding data is discarded in the MAC-hs sublayer.

The maximum transmission delay of data in the HSDPA scheduler is received from the RNC when the service is established. This information can be transmitted through the Iur interface or the Iub interface. In particular, the Radio Network Subsystem Application Part (RNSAP) protocol defined in the Iur interface of UMTS or Node B Application Part (NBAP) protocol defined in the Iub interface of UMTS can be used.

The packet scheduling method for the HSDPA system in accordance with the preferred embodiment has many advantages.

For example the HSDPA scheduler in the Node B can support both real-time and non-real-time services with the delay of data and the priority level of data, respectively.

Additionally, the results can be achieved by using the existing frame format or by implementing a new frame format.

Moreover, real-time data can be prioritized over non-real-time data for efficient transmission.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A method of transmitting data in a High Speed Downlink Packet Access (HSDPA) system, the method comprising:
   including data to a frame, the frame is related to a HS-DSCH (High Speed Downlink Shared Channel);
   including delay information to the frame, the delay information indicating a data transmission delay or a latency of the data;
   including an indicator to the frame, the indicator indicating whether the delay information is present; and
   transmitting, to a scheduler, the frame comprising the data, the delay information and the indicator.

2. The method of claim 1, further comprising:
   including user buffer size information to the frame.

3. The method of claim 1, wherein the delay information is a value based on the time unit of 1 ms or 1 TTI (Transmission Time Interval).

4. The method of claim 1, wherein the data is real-time data.

5. The method of claim 1, wherein the data is at least one MAC-hs service data unit (SDU).

6. The method of claim 1, wherein the scheduler obtains buffer status information and channel status information.

7. The method of claim 1, wherein the scheduler is located in a medium access control-high speed (MAC-hs) sub-layer, and the MAC-hs sub-layer supports a hybrid automatic repeat request (HARQ) function.

8. The method of claim 1, wherein the scheduler is located in a base station (Node B), and the base station (Node B) supports a hybrid automatic repeat request (HARQ) function.

9. A method of transmitting data in a High Speed Downlink Packet Access (HSDPA) system, the method comprising:
   receiving, by a scheduler, a frame comprising data, delay information indicating a data transmission delay or a latency of the data, and an indicator indicating whether the delay information is present, wherein the frame is related to a HS-DSCH (High Speed Downlink Shared Channel);
   scheduling, by the scheduler, the data using the delay information in the received frame, wherein the delay information is identified by the indicator; and
   transmitting the data according to the scheduling of the scheduler.

10. The method of claim 9, wherein the frame further comprises user buffer size information.

11. The method of claim 9, wherein the delay information is a value based on the time unit of 1 ms or 1 TTI (Transmission Time Interval).

12. The method of claim 9, wherein the data is real-time data.

13. The method of claim 9, wherein the data is at least one MAC-hs service data unit (SDU).

14. The method of claim 9, wherein the scheduler obtains buffer status information and channel status information.

15. The method of claim 9, wherein the scheduler is located in a medium access control-high speed (MAC-hs) sub-layer, and the MAC-hs sub-layer supports a hybrid automatic repeat request (HARQ) function.

16. The method of claim 9, wherein the scheduler is located in a base station (Node B), and the base station (Node B) supports a hybrid automatic repeat request (HARQ) function.

* * * * *